Patented Aug. 22, 1950

2,519,715

UNITED STATES PATENT OFFICE 2,519,715

1-CARBAMYL-4-HETEROCYCLO-PIPERAZINES

Hugh Wendell Stewart, Plainfield, N. J., assignor to American Cyanamid Company, New York, N. Y., a corporation of Maine No Drawing. Application November 12, 1947, Serial No. 785,532

6 Claims. (Cl. 260—250)

The present invention relates to N-heterocyclic piperazines. More particularly it relates to the preparation of 1,4-disubstituted piperazines having a

group in the 1-position and a nitrogen-containing heterocyclic substituent in the 4-position and to the compounds so produced.

More specifically the present invention relates to compounds of the following generic formula:

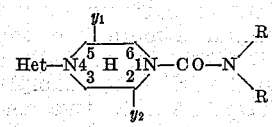

wherein Het represents a 5 or 6 membered heterocyclic radical containing at least one hetero nitrogen atom, and in some cases additional hetero atoms comprising nitrogen, sulfur or oxygen. The group designated Het, for example, may be selected from the group consisting of the pyridyl, pyrimidyl, pyrazyl, thiazolyl and the like radicals and/or alkyl- or halogen-substituted pyridyl, pyrimidyl and pyrazyl radicals. In the piperazine ring the bond from the nitrogen in the 4-position is to a

grouping in the Het radical. R may be an alkyl radical of from 1 to 6 carbon atoms.

The compounds of the present invention being 1,4-substituted piperazines, the latter ring is shown as saturated. However, in addition to the 1,4-substituents, the carbon atoms of the ring may also be substituted. As shown in the generic formula above, $y_1$ and $y_2$ may be either hydrogen or a lower alkyl group, particularly the methyl and ethyl radicals. The invention therefore contemplates 1,4-disubstituted mono- and di-alkyl piperazines such as ethyl-, dimethyl- and diethylpiperazine.

The compounds of the present invention, therefore, may be classified as carbamyl piperazines. In general, they comprise white to tan crystalline materials. In some cases, the softening point is very low, in which cases the compounds may take the form of an oil. The compounds are, in general, only slightly soluble in water but readily soluble in the ordinary alkanols, chloroform, ether, and, to varying extent, hydrocarbon solvents such as naphtha. Some of the compounds are sufficiently basic in character, to form addition salts with acids such as hydrochloric, hydrobromic, sulfuric, citric and the like. Others, however, do not form a readily defined salt. Where formed, the acid addition salts are generally water soluble, and some are even hygroscopic.

Preparation of the new compounds of the present invention may be accomplished in several ways, dependent to a large extent on the nature of the product to be obtained. Some methods are of general application. Others are specific to particular compounds or a group or groups of compounds.

However, two methods are generally applicable to the preparation of these new compounds. Using X to represent the

grouping and Y to represent a halogen radical, these procedures may be represented as follows:

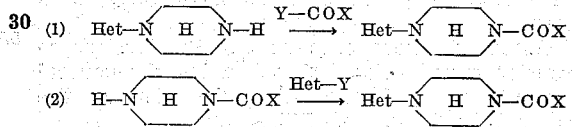

Since 1-carbamyl-piperazines may be readily prepared, method (2) above is generally to be preferred in making these new compounds in which X is a disubstituted-amino radical, i. e., dimethylamino, piperidyl, morpholyl, diethylamino, and the like. Generalizations concerning the reaction conditions necessary for the preparation of these compounds by method (2) above are difficult to make. These conditions depend principally upon the reactivity of the halogen group in the halogen-substituted heterocyclic compound used as starting material. Since bromo heterocyclic compounds possess a more reactive halogen atom than corresponding chloro heterocyclic compounds, and, for example, since 2-chloropyrimidine possesses a much more reactive halogen atom than 2-chloropyrazine or 2-bromo-pyridine, reactions involving these compounds may be carried out under quite different conditions.

In general, where 2-chloropyrimidine or a compound having a similarly reactive halogen is used as the halogen-substituted heterocyclic compound in method (2) above, a rapid reaction occurs simply by heating under reflux the halogen compound with a 1-carbamylpiperazine in a solvent such as ethanol. Usually this is done in the presence of an acid-accepting agent such as an alkali metal carbonate or bicarbonate.

In contrast to this, in order to achieve, in a reasonable time, a comparable degree of completeness in a similar reaction in which 2-chloropyrazine, 2-bromopyridine, or a compound having a similarly reactive halogen is utilized in place of the more reactive halogen compound, such as 2-chloropyrimidine, it is necessary for the reaction to be carried out under reflux in an inert high-boiling solvent, such as a dichlorobenzene, and in the presence of an acid-accepting agent, or in a high-boiling acid-accepting solvent such as quinoline, lutidine, etc.

The new products of the present invention as derived from these reactions may be isolated in a variety of ways, depending upon the reaction medium. In some cases, where the reaction is carried out in water-immiscible solvents, the extraneous salts present in the reaction mixture are dissolved by the addition of water in which the product is substantially insoluble. The product may then be removed from the non-aqueous layer by extraction as a salt thereof with an aqueous solution of a salt-forming acid. The extract may then be treated to separate product from the solvent and the former purified in any suitable manner as by distillation, recrystallization and the like. The more suitable methods are demonstrated below in the illustrative examples.

When it is desirable and possible to form a salt of the free base, it is only necessary to treat a solution of the base with the salt-forming acid. An acid solution may be added to a solution of the base, or, if the acid is a gas, it may be simply bubbled through the solution. Precipitation of the salt is readily accomplished by evaporation. In some cases, reduced pressure and/or drying agents may be required. This is due to the fact, noted above, that some of the salts are hygroscopic. Some of the salts obtained as well defined crystals appear to be in a partially hydrated form.

Among the new compounds of the present invention may be listed those having the general formula set forth above in which Het has the value defined therein. X in the general formula may be quite widely varied and as noted above may constitute the residue of an amine of the type

wherein R has the values noted above. Typical compounds of the present invention are those represented by the general formula:

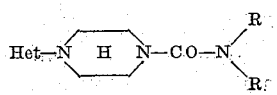

wherein Het and R have the values shown in the following table:

| Het | R |
|---|---|
| (pyrimidine) | —$C_2H_5$ |
| (pyrimidine) | —$CH_3$ |
| (pyrazine) | —$C_2H_5$ |
| (pyrazine) | —$CH_3$ |
| (chloropyrazine) | —$C_2H_5$ |
| (pyridine) | —$C_2H_5$ |
| (pyridine) | ($n$—$C_6H_{13}$) |

Compounds of the present invention exhibit surprisingly varied properties. The compounds in general have analgesic properties. They exhibit distinct possibilities as pharmacologically-active compounds for this purpose. They are characterized by low acute toxicity.

The preparation of typical compounds of the present invention is more fully shown in conjunction with the use of 1-diethylcarbamyl-piperazine in the following examples which are given as illustrative only and not by way of limitation. All parts are by weight unless otherwise noted.

EXAMPLE 1

*1-diethylcarbamyl-4-(2-pyrazyl)-piperazine*

To 195 parts of o-dichlorobenzene are added 92.5 parts of 1-diethylcarbamylpiperazine, 57 parts of 2-chloropyrazine and 84 parts of sodium bicarbonate. The reaction mixture is heated for eight and one-half hours with stirring at the reflux temperature during which time the water formed is continually removed by distillation. The reacted mixture is then cooled and stirred into 300 parts of water. The layers form and are separated, the upper layer being extracted with 250 parts of normal hydrochloric acid. The acid extract is made basic by addition of solid potassium carbonate, whereon an oil separates and is then taken up in diethyl ether. The ether extract is dried, the ether removed and the residue distilled. The product, distilling at about 214°–217° C. at five mm., is collected as a viscous yellow oil. This oil, which solidifies on standing, melts at 39°–43° C. The hydrochloride, prepared by reacting the base in ethanol solution with hydrogen chloride gas, melts with decomposition at 133°–135° C.

EXAMPLE 2

*1-diethylcarbamyl-4-[2-(5-chloro-pyrimidyl)]-piperazine*

To 173 parts of ethyl alcohol add 92.5 parts of 1-diethylcarbamylpiperazine, 84 parts of sodium bicarbonate and 74.5 parts of 2,5-dichloropyrimidine. After the initial exothermic reaction subsides, the reaction mixture is heated under reflux for one-half hour. The resultant inorganic salts are removed by filtration of the hot solution and the salt cake is washed with 158 parts of hot ethanol. The filtrate is combined with the washings, treated with 200 parts of water and cooled. The product, which separates, is isolated by filtration, washed and dried. There is obtained 146 parts of white 1-diethylcarbamyl - 4 - [2 - (5 - chloropyrimidyl)] - piperazine. The product is further purified by crystallization from aqueous ethyl alcohol. The pure piperazine compound melts at about 77°–78° C.

I claim:

1. A 1-heterocyclic piperazine of the formula

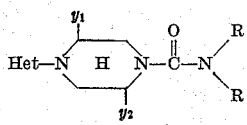

wherein $y_1$ and $y_2$ are selected from hydrogen, methyl and ethyl, Het is a radical selected from pyridyl, pyrimidyl, pyrazyl, and their halogen substituted derivative radicals, the bond from the nitrogen in the piperazine ring to Het being to a

group, and R is selected from the lower alkyl radicals of 1 to 6 carbon atoms.

2. A 1-heterocyclic piperazine of the formula

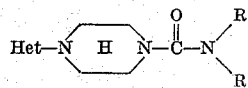

wherein Het is a radical selected from pyridyl, pyrimidyl, pyrazyl, and their halogen substituted derivative radicals, the bond from the nitrogen in the piperazine ring to Het being to a

group, and R is selected from the lower alkyl radicals of 1 to 6 carbon atoms.

3. A 1-heterocyclic piperazine according to claim 2 in which Het is pyrazyl.

4. A 1-heterocyclic piperazine according to claim 2 in which Het is pyrimidyl.

5. 1 - diethylcarbamyl - 4 - (2 - pyrazyl) - piperazine.

6. 1 - diethylcarbamyl - 4 - [2 - (5 - chloropyrimidyl)]-piperazine.

HUGH WENDELL STEWART.

No references cited.

Certificate of Correction

Patent No. 2,519,715                                                    August 22, 1950

HUGH WENDELL STEWART

It is hereby certified that error appears in the printed specification of the above numbered patent requiring correction as follows:

Column 1, line 44, after the words "such as" insert *methyl-,*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*